UNITED STATES PATENT OFFICE.

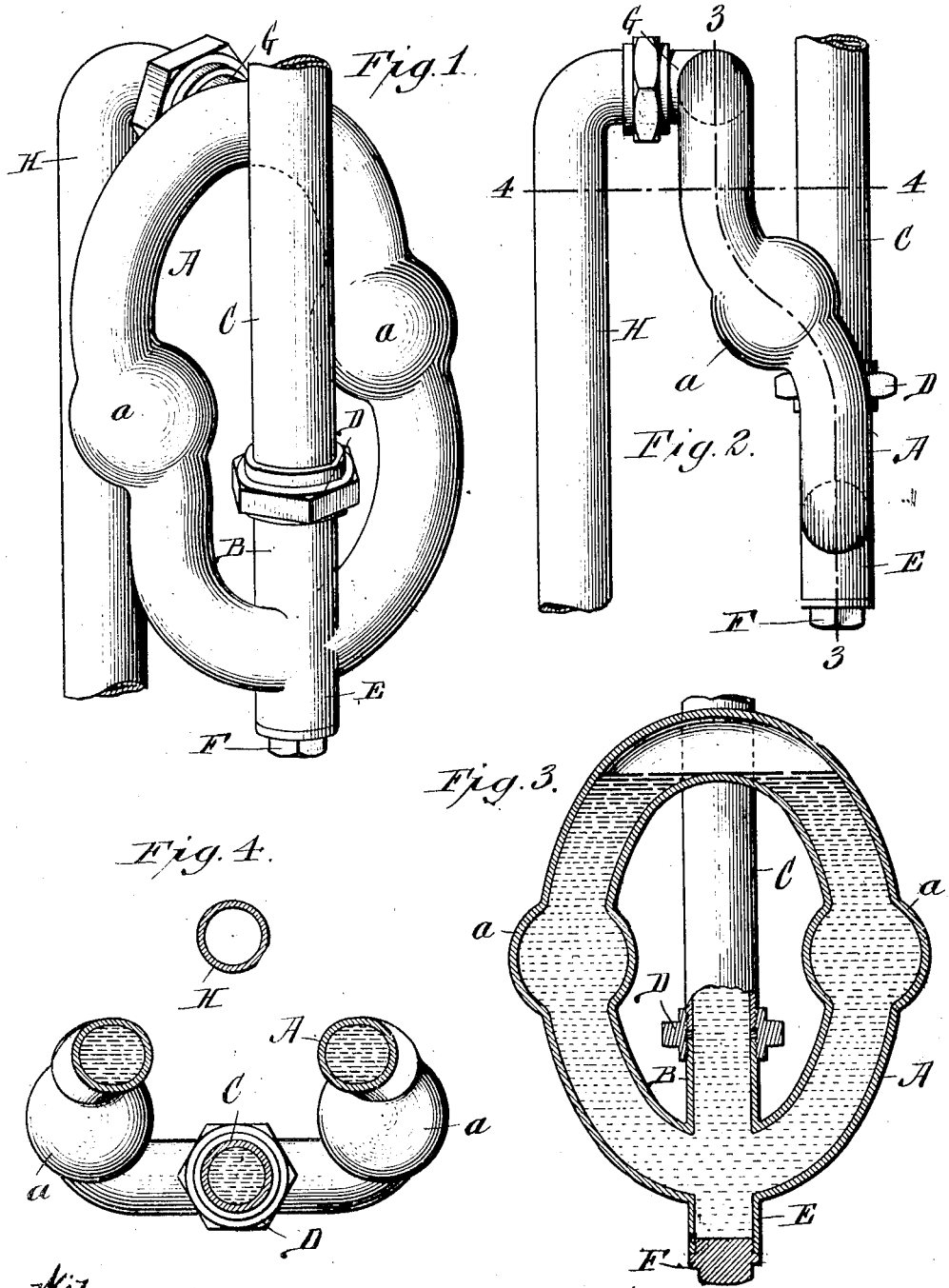

GEORGE O. MILLER, OF NORTH TONAWANDA, NEW YORK, ASSIGNOR TO LOUIS A. KELSEY, OF NORTH TONAWANDA, NEW YORK.

ANTISIPHON-TRAP.

No. 927,667.　　　　Specification of Letters Patent.　　　　Patented July 13, 1909.

Application filed July 14, 1908. Serial No. 443,531.

*To all whom it may concern:*

Be it known that I, GEORGE O. MILLER, a citizen of the United States, and resident of North Tonawanda, in the county of Niagara and State of New York, have invented certain new and useful Improvements in Antisiphon-Traps, of which the following is a specification.

My invention relates to an improved anti-siphon trap; and it has for its objects, the production of a simple, durable and inexpensive trap which will retain its seal under all conditions of use and under the most rigid test; to so construct the trap that all baffle-plates and interior obstruction to the free passage of water are obviated, and so that the trap is self-cleansing and no pockets or crevices are formed for the lodging of slime and other matter.

The invention consists in the construction, arrangement, and combination of parts to be hereinafter described and particularly pointed out in the appended claims.

In the drawings,—Figure 1 is a perspective view of a trap constructed according to my invention, with inlet and outlet-pipes connected thereto. Fig. 2 is a side elevation of the same. Fig. 3 is a longitudinal section through the body of the trap taken on line 3—3, Fig. 2. Fig. 4 is a transverse section through the trap, taken on line 4—4, Fig. 2.

Referring now to the drawings in detail, like letters of reference refer to like parts in the several figures.

The trap comprises an endless tubular body or continuous loop A preferably of oval formation, and curved midlength so that opposite ends are in different vertical planes.

Entering the lower end of the trap from the top is an induction-pipe B to which the waste pipe C is secured by a suitable coupling D, and depending from the lower end of said trap is a clean-out tube E closed by means of a plug F threaded thereinto, which plug can be removed to clean the trap of any sediment that may have lodged on the bottom. By curving the trap at a point midlength, the waste pipe C need not be bent and can therefore be more readily affixed to the trap.

At its upper end the trap has an outlet-tube G to which a pipe H is connected which leads to the sewer. The curved intermediate portions of the trap are provided with enlargements a, which are by preference of substantially spherical formation so that the walls thereof merge into the walls of the tubular parts of the trap without forming sharp angles. These enlargements positively prevent siphoning of the trap under the severest action it may be subjected to, owing to the air drawn into the trap with the water during the siphoning-action causing a separation of the stream of water, and consequently breaking the siphonic-action.

By arranging the inlet centrally at the lower end of the trap and the outlet centrally at the upper end thereof, the water entering the trap through the waste-pipe C is divided into two streams which flow through opposite sides of the trap and pass out the outlet in a common stream. The water-seal is of a depth to occupy almost the entire height of the trap and as it rises in two separated bodies from the inlet of the trap and no partitions are employed in the latter, the water entering the trap has a free and easy escape.

Having thus described my invention, what I claim is,—

1. An anti-siphon trap consisting of a body formed of a continuous tube having enlargements in the tube at opposite sides, an inlet entering the body at its lower end, and an outlet at the upper end of the body.

2. An anti-siphon trap consisting of a substantially oval body formed of a continuous tube bent or offset between the ends of the body so that the upper and lower portions of the latter are in different vertical planes, said tube being enlarged at the points where it is offset, an inlet entering the top of the tube at the lower end of the body and an outlet for the tube at the upper end of the body.

3. An anti-siphon trap consisting of a substantially oval body formed of a continuous tube having an inlet entering the top of the tube at its lowest portion and an outlet at the upper end of the body, said body being offset or bent between its ends so that the upper and lower portions of the same are in different vertical planes.

In testimony whereof, I have affixed my signature in the presence of two subscribing witnesses.

GEORGE O. MILLER.

Witnesses:
　CHRIST FEINLE, Jr.,
　ELLA C. PLUECKHAHN.